US011453057B2

(12) United States Patent
Okada et al.

(10) Patent No.: US 11,453,057 B2
(45) Date of Patent: Sep. 27, 2022

(54) SAMARIUM-IRON-NITROGEN ALLOY POWDER AND METHOD FOR PRODUCING SAME

(71) Applicants: Shusuke Okada, Aichi (JP); Kazuyuki Suzuki, Aichi (JP); Kenta Takagi, Aichi (JP); Kimihiro Ozaki, Aichi (JP); Yasushi Enokido, Tokyo (JP)

(72) Inventors: Shusuke Okada, Aichi (JP); Kazuyuki Suzuki, Aichi (JP); Kenta Takagi, Aichi (JP); Kimihiro Ozaki, Aichi (JP); Yasushi Enokido, Tokyo (JP)

(73) Assignees: National Institute of Advanced Industrial Science and Technology, Tokyo (JP); TDK Corporation, Tokyo (JP)

( * ) Notice: Subject to any disclaimer, the term of this patent is extended or adjusted under 35 U.S.C. 154(b) by 156 days.

(21) Appl. No.: 16/081,299

(22) PCT Filed: Feb. 28, 2017

(86) PCT No.: PCT/JP2017/007905
§ 371 (c)(1),
(2) Date: Aug. 30, 2018

(87) PCT Pub. No.: WO2017/150557
PCT Pub. Date: Sep. 8, 2017

(65) Prior Publication Data
US 2020/0016663 A1 Jan. 16, 2020

(30) Foreign Application Priority Data
Mar. 4, 2016 (JP) .............................. JP2016-041692

(51) Int. Cl.
*B22F 9/20* (2006.01)
*B22F 1/00* (2022.01)
(Continued)

(52) U.S. Cl.
CPC ............. *B22F 9/20* (2013.01); *B22F 1/00* (2013.01); *B22F 1/145* (2022.01);
(Continued)

(58) Field of Classification Search
CPC .... B22F 2999/00; B22F 2998/10; B22F 9/04; B22F 3/02; B22F 2009/048;
(Continued)

(56) References Cited

U.S. PATENT DOCUMENTS 5,609,695 A * 3/1997 Kojima ................. B22F 9/023
148/101
6,334,908 B1 1/2002 Kawano et al.
(Continued)

FOREIGN PATENT DOCUMENTS

JP  H11-214207  8/1999
JP  H11-241104  9/1999
(Continued)

OTHER PUBLICATIONS

Isnard O., et al.; "High Field Magnetization measurements of Sm2Fe17, Sm2Fe17Cx, and Sm2Fe17CxH5-x", Hard Magnets: Nitrides Films, Ferrites, 1994 (Year: 1994).*
(Continued)

*Primary Examiner* — Alexandra M Moore
*Assistant Examiner* — Austin Pollock
(74) *Attorney, Agent, or Firm* — IPUSA, PLLC (57) ABSTRACT

A samarium-iron-nitrogen alloy powder according to one embodiment of the present invention is characterized in that a value obtained by dividing the hydrogen content of the samarium-iron-nitrogen alloy powder by the BET specific surface area of the samarium-iron-nitrogen alloy powder is less than or equal to 400 ppm/(m$^2$/g), and a value obtained by dividing the oxygen content of the samarium-iron-nitrogen alloy powder by the BET specific surface area of the
(Continued)

samarium-iron-nitrogen alloy powder is less than or equal to 11,000 ppm/(m²/g).

7 Claims, 2 Drawing Sheets

(51) Int. Cl.
  *C22C 32/00* (2006.01)
  *H01F 1/059* (2006.01)
  *H01F 41/02* (2006.01)
  *B22F 1/145* (2022.01)
  *C22C 33/02* (2006.01)

(52) U.S. Cl.
  CPC ......... *C22C 32/0068* (2013.01); *H01F 1/059* (2013.01); *H01F 41/02* (2013.01); *C01P 2004/03* (2013.01); *C01P 2004/32* (2013.01); *C01P 2006/12* (2013.01); *C01P 2006/42* (2013.01); *C22C 33/02* (2013.01); *C22C 33/0228* (2013.01); *C22C 2202/02* (2013.01); *H01F 1/0596* (2013.01)

(58) Field of Classification Search
  CPC ...... B22F 2201/02; B22F 3/10; B22F 1/0059; B22F 3/14; B22F 1/0085; B22F 2003/248; B22F 2201/013; B22F 2301/355; B22F 1/0088; B22F 2202/05; B22F 3/24; B22F 9/023; B22F 1/00; B22F 1/0003; B22F 1/0062; B22F 9/082; B22F 2201/10; B22F 5/00; B22F 1/02; B22F 2003/023; B22F 3/105; B22F 1/007; B22F 2009/043; B22F 2009/0812; B22F 3/00; B22F 3/008; B22F 9/008; B22F 1/0014; B22F 1/025; B22F 2201/016; B22F 2201/20; B22F 9/08; B22F 9/22; B22F 1/0011; B22F 1/0096; B22F 2003/208; B22F 2009/045; B22F 2009/047; B22F 2301/30; B22F 2302/20; B22F 2304/10; B22F 3/1017; B22F 3/1055; B22F 3/16; B22F 3/225; B22F 2003/1051; B22F 2009/044; B22F 2201/01; B22F 2201/04; B22F 2202/13; B22F 2207/11; B22F 2301/40; B22F 2301/45; B22F 3/004; B22F 3/03; B22F 3/20; B22F 9/20; B22F 1/0007; B22F 1/0018; B22F 1/0044; B22F 2001/0066; B22F 2003/1054; B22F 2009/046; B22F 2009/049; B22F 2201/03; B22F 2201/11; B22F 2301/00; B22F 2301/15; B22F 2302/45; B22F 2303/01; B22F 3/04; B22F 3/087; B22F 3/11; B22F 3/15; B22F 3/227; B22F 7/06; B22F 7/08; B22F 9/00; B22F 9/24; B22F 2304/05–058; C22C 2202/02; C22C 38/005; C22C 38/00; C22C 38/001; C22C 33/0278; C22C 33/0257; C22C 38/002; C22C 33/02; C22C 1/0433; C22C 38/02; C22C 38/06; C22C 38/10; C22C 2200/04; C22C 33/0235; C22C 38/04; C22C 38/12; C22C 38/14; C22C 38/28; C22C 12/00; C22C 18/02; C22C 2200/02; C22C 33/0264; C22C 38/18; C22C 19/03; C22C 19/07; C22C 1/0491; C22C 1/08; C22C 2202/04; C22C 22/00; C22C 32/0068; C22C 33/04; C22C 38/08; C22C 38/16; C22C 38/20; C22C 38/26; C22C 38/40; C22C 47/14; C22C 49/02; C22C 49/14; C22C 33/0228; H01F 1/059; H01F 41/0266; H01F 1/0578; H01F 41/0253; H01F 1/0558; H01F 1/083; H01F 41/0273; H01F 1/0577; H01F 1/0596; H01F 7/02; H01F 1/053; H01F 1/0533; H01F 1/0551; H01F 1/0557; H01F 1/06; H01F 1/057; H01F 1/0579; H01F 1/08; H01F 41/02; H01F 41/0293; H01F 7/021; H01F 1/086; H01F 1/113; H01F 13/003; H01F 1/047; H01F 1/0536; H01F 1/0572; H01F 41/0246; H01F 41/028; H01F 7/0221; H01F 10/08; H01F 10/12; H01F 10/126; H01F 10/30; H01F 10/3204; H01F 10/3286; H01F 1/00; H01F 1/01; H01F 1/032; H01F 1/0552; H01F 1/0556; H01F 1/065; H01F 1/09; H01F 1/11; H01F 1/15375; H01F 1/20; H01F 1/22; H01F 1/28; H01F 1/342; H01F 1/344; H01F 1/37; H01F 2003/103; H01F 2003/106; H01F 2038/026; H01F 27/22; H01F 3/10; H01F 3/14; H01F 41/18; H01F 41/306; H01F 7/0252; H01F 7/0257; H01F 7/0268; H02K 15/03; H02K 1/02; H02K 1/2766; H02K 21/16; H02K 11/215; H02K 21/14; H02K 3/28; H02K 1/2713; H02K 1/17; H02K 1/27; H02K 1/278; H02K 2213/03; H02K 1/24; H02K 1/2706; H02K 1/2746; H02K 1/14; H02K 1/146; H02K 7/083; H02K 7/1166; H02K 16/02; H02K 19/103; H02K 19/22; H02K 1/185; H02K 1/22; H02K 1/226; H02K 1/243; H02K 1/272; H02K 1/276; H02K 1/30; H02K 21/044; H02K 21/12; H02K 23/04; H02K 29/03; H02K 3/18; H02K 7/14; H02K 15/14; H02K 16/00; H02K 1/148; H02K 1/16; H02K 1/18; H02K 1/20; H02K 1/2733; H02K 1/2773; H02K 1/2793; H02K 21/24; H02K 2201/06; H02K 2201/12; H02K 23/40; H02K 29/08; H02K 33/18; H02K 3/02; H02K 3/12; H02K 41/0356; H02K 5/1732; H02K 5/24; H02K 7/003; H02K 7/006; H02K 7/1823
  See application file for complete search history.

(56) References Cited

U.S. PATENT DOCUMENTS

| | | | | |
|---|---|---|---|---|
| 2002/0029824 | A1* | 3/2002 | Kawano | H01F 1/059 148/105 |
| 2011/0074531 | A1* | 3/2011 | Yamashita | H01F 41/028 335/302 |
| 2012/0145944 | A1* | 6/2012 | Komuro | H01F 41/0293 252/62.51 R |
| 2014/0112818 | A1* | 4/2014 | Maeda | C22C 38/001 419/1 |

FOREIGN PATENT DOCUMENTS

| | | | | |
|---|---|---|---|---|
| JP | 2001-220628 | | 8/2001 | |
| JP | 2002246214 A | * | 8/2002 | ........... H01F 1/0596 |
| JP | 2003221609 A | * | 8/2003 | |
| JP | 2004-111515 | | 4/2004 | |
| JP | 2004111515 A | * | 4/2004 | |
| JP | 2004146713 A | * | 5/2004 | |
| JP | 2004263275 A | * | 9/2004 | |
| JP | 2004263276 A | * | 9/2004 | |

(56) References Cited

FOREIGN PATENT DOCUMENTS

| JP | 2005272986 A | * | 10/2005 |
|---|---|---|---|
| JP | 2007-119909 | | 5/2007 |
| JP | 2007327101 A | * | 12/2007 |
| JP | 2015005550 A | * | 1/2015 |
| JP | 2015070102 A | * | 4/2015 |

OTHER PUBLICATIONS

Iriyama T., et al. "Magnetic Properties of Sm2Fe17Nx". J. of Magnetics, vol. 7, 1992 (Year: 1992).*
Kobayashi K, "Review of Research and Development of Sm2Fe17Nx Hard Magnetic Materials", J. of Magnetics, vol. 8 (Year: 1993).*
Kobayashi K, et al.; "Magnetic properties of the single magnetic domain particles of Sm2Fe17Nx compounds", J. alloy and compounds, 193, 1993 (Year: 1993).*
Iriyama T., et al. "Effect of Nitrogen Content on Magnetic Properites of Sm2Fe17Nx", Transactions of Magnetics, vol. 28, 1992 (Year: 1992).*
Okada S., et al.; "Development Synthesis Method for Highly Heat-Resistant Rare Earth Magnet Powder without Heavy Rare Earths", AIST, Aug. 4, 2020 (Year: 2020).*
Okada S., et al.; "Preparation of submicron-sized Sm2Fe17N3 fine powder with high coercivity by reduction-diffusion process", J. of Alloys and Compounds; 695, 2017, 1617-1623 (Year: 2017).*
Fang Q., et al.; "The structure and magnetic properties of Sm—Fe—N powders prepared by ball milling at low temperature"; J. of Magnetism and Magnetic Materials; 410, 2016, 116-122 (Year: 2016).*
Hirayama Y., et al.; "High coercivity Sm2Fe17N3 submicron size powder prepared by polymerized-complex and reduction-diffusion process"; Scripts Materialia; 120, 2016, 27-30 (Year: 2016).*
International Search Report for PCT/JP2017/007905 dated May 9, 2017.
O. Isnard et al., High field magnetization measurements of Sm2Fe17, Sm2Fe17Cx, and Sm2Fe17CxH5-x, Journal of Applied Physics, 1994. 11.15, vol. 76, No. 10, pp. 6035-6037.

* cited by examiner

SAMARIUM-IRON-NITROGEN ALLOY POWDER AND METHOD FOR PRODUCING SAME

TECHNICAL FIELD

The present invention relates to a samarium-iron-nitrogen alloy powder and a method for producing a samarium-iron-nitrogen alloy powder.

BACKGROUND ART

Currently, neodymium-iron-boron magnets are used for various purposes as high performance magnets.

However, neodymium-iron-boron magnets have a low Curie temperature of 312° C. and have low heat resistance. Thus, to use neodymium-iron-boron magnets in a heat-exposed environment such as a motor, dysprosium has to be added. Because the supply of dysprosium is limited due to its low production and limited production areas, high performance magnets with high heat resistance that do not have dysprosium added thereto are being developed.

Samarium-iron-nitrogen alloy magnets have the same level of saturation magnetization as neodymium-iron-boron alloy magnets, a high Curie temperature of 477° C., small change of magnetic properties with temperature, and an extremely high magnetic anisotropy field of 260 kOe as the theoretical value of coercivity, which is about 3 times that of neodymium-iron-boron magnets. As such, there are high expectations for the development of samarium-iron-nitrogen alloy magnets as magnets with high heat resistance.

Reduction-diffusion process is known as one method for producing a samarium-iron-nitrogen alloy powder. In the method, a samarium-iron-nitrogen alloy powder is produced via reduction-diffusion of hydrogen-reduced samarium-iron oxide particles produced by a coprecipitation method or the like to samarium-iron alloy particles, nitriding the samarium-iron alloy particles, and then washing and removing unreacted calcium and calcium oxide corresponding to a by-product.

In this method, fine samarium-iron-nitrogen alloy powder can be directly produced without performing a pulverization process. The samarium-iron-nitrogen alloy powder produced by this method has few distortions and edges that can generate reverse magnetic domain, and as such, the samarium-iron-nitrogen alloy powder that has an average particle diameter of about 2 μm exhibits a high coercivity of 15 to 16 kOe (see, e.g., Patent Document 1).

In Patent Document 1, a bonded magnet produced using a samarium-iron-nitrogen alloy powder having an average particle diameter of 1.0 μm exhibits a high coercivity of 20.3 kOe (see Table 1 of Patent Document 1).

However, in Example 1 of Patent Document 1, the coercivity of the samarium-iron-nitrogen alloy powder having an average particle diameter of 2.0 μm is 15.2 kOe, and the coercivity of a bonded magnet produced therefrom is 17.3 kOe (see Table 1 of Patent Document 1).

From the above, it may be presumed that the coercivity of 20.3 kOe of the bonded magnet produced using the samarium-iron-nitrogen alloy powder with an average particle diameter of 1.0 μm includes a coercivity improvement through producing a bond magnet, and the coercivity of the samarium-iron-nitrogen alloy powder may be estimated to be about 17 to 18 kOe.

A further increase in the coercivity of the samarium-iron-nitrogen alloy powder is required for application in motors used in electric vehicles and the like that require high heat resistance.

A method for increasing the coercivity of the samarium-iron-nitrogen alloy powder is known that involves micronizing the samarium-iron-nitrogen alloy powder. Samarium-iron-nitrogen alloy powder is known to exhibit higher coercivity as its average particle diameter (Da) becomes smaller (see, e.g., FIG. 3 of Patent Document 2).

However, the coercivity of the samarium-iron-nitrogen alloy powder sharply decreases when the average particle diameter (Da) of the samarium-iron-nitrogen alloy powder becomes less than or equal to 1 μm.

In view of the above, it has been conceived that producing a samarium-iron-nitrogen alloy powder having high coercivity, particularly, a samarium-iron-nitrogen alloy powder having a coercivity exceeding 20 kOe, would be difficult even by micronizing the samarium-iron-nitrogen alloy powder.

PRIOR ART DOCUMENTS

Patent Documents

Patent Document 1: Japanese Unexamined Patent Publication No. 11-214207

Patent Document 2: Japanese Unexamined Patent Publication No. 11-241104

SUMMARY OF THE INVENTION

Problem to be Solved by the Invention

An aspect of the present invention is directed to providing a samarium-iron-nitrogen alloy powder having high coercivity.

Means for Solving the Problem

A samarium-iron-nitrogen alloy powder according to one embodiment of the present invention is characterized in that a value obtained by dividing the hydrogen content of the samarium-iron-nitrogen alloy powder by the BET specific surface area of the samarium-iron-nitrogen alloy powder is less than or equal to 400 ppm/($m^2$/g), and a value obtained by dividing the oxygen content of the samarium-iron-nitrogen alloy powder by the BET specific surface area of the samarium-iron-nitrogen alloy powder is less than or equal to 11,000 ppm/($m^2$/g).

A method for producing a samarium-iron-nitrogen alloy powder according to one embodiment of the present invention includes steps of performing a reduction-diffusion process on a samarium-iron alloy precursor powder to produce a samarium-iron alloy powder, nitriding the samarium-iron alloy powder, washing the nitrided samarium-iron alloy powder with a solvent capable of dissolving calcium, and dehydrogenating the washed powder to produce the samarium-iron-nitrogen alloy powder. The reduction-diffusion process step, the nitriding step, the washing step, and the dehydrogenating step are carried out in a non-oxidizing atmosphere.

Advantageous Effect of the Invention

According to an aspect of the present invention, a samarium-iron-nitrogen alloy powder having high coercivity may be provided.

EMBODIMENTS FOR IMPLEMENTING THE INVENTION

The inventors of the present invention have investigated the reason a samarium-iron-nitrogen alloy powder having an average particle diameter less than or equal to 1 μm could not exhibit high coercivity and by solving this problem, the inventors have arrived at the present invention.

In order to produce a samarium-iron-nitrogen alloy powder having an average particle diameter less than or equal to 1 μm, in the present embodiment, a reduction-diffusion process is performed on a samarium-iron alloy precursor powder. In this way, a samarium-iron alloy powder having an average particle diameter less than or equal to 1 μm can be produced, and by nitriding the samarium-iron alloy powder and washing the nitrided samarium-iron alloy powder with a solvent capable of dissolving calcium, a samarium-iron-nitrogen alloy powder having an average particle diameter less than or equal to 1 μm can be produced.

A samarium-iron-nitrogen alloy powder does not exhibit a desirably high coercivity by merely micronizing the samarium-iron-nitrogen alloy powder as in the prior art until the average particle diameter becomes less than or equal to 1 μm. Upon investigation, it was found that hydrogen generated in the process of washing the samarium-iron-nitrogen alloy powder with a solvent capable of dissolving calcium enters in between the crystal lattices of the samarium-iron-nitrogen alloy powder and expands the lattice spacing along the c-axis direction. In this respect, it was found that by performing dehydrogenation after washing the samarium-iron-nitrogen alloy powder with a solvent capable of dissolving calcium, expansion of the lattice spacing of the samarium-iron-nitrogen alloy powder along the c-axis direction could be controlled and the samarium-iron-nitrogen alloy powder could exhibit high coercivity.

In the present embodiment, dehydrogenation is completed by subjecting the samarium-iron-nitrogen alloy powder to a heat treatment at about 200° C. under vacuum or in an inert gas atmosphere for several hours. In this way, the hydrogen content of the samarium-iron-nitrogen alloy powder can be substantially reduced, and expansion of the crystal lattice along the c-axis direction can be controlled. As a result, for example, a samarium-iron-nitrogen alloy powder having an average particle diameter of 0.93 μm and a coercivity of 18.1 kOe, and a samarium-iron-nitrogen alloy powder having an average particle diameter of 0.63 μm and a coercivity of 22.8 kOe can be obtained.

In a samarium-iron-nitrogen alloy powder having an average particle diameter less than or equal to 1 μm, substantial changes in magnetic properties can occur due to a slight difference in the surface state, particularly, a slight difference in the oxygen content. Thus, a series of process steps for producing the samarium-iron-nitrogen alloy powder have to be carried out in a glove box or the like to avoid exposure to the atmosphere.

In the following, a samarium-iron-nitrogen alloy powder and a method for producing a samarium-iron-nitrogen alloy powder according to embodiments of the present invention will be described in detail. Note that overlapping descriptions will be omitted as appropriate. Also, when a numerical range is expressed by two numerical values with the symbol "~" indicated between the two numerical values, for example, the numerical range includes the two numerical values.

[Samarium-Iron-Nitrogen Alloy Powder]

A samarium-iron-nitrogen alloy powder according to an embodiment of the present invention is characterized in that a value H/S obtained by dividing the hydrogen content H of the samarium-iron-nitrogen alloy powder by the BET specific surface area S of the samarium-iron-nitrogen alloy powder is less than or equal to 400 ppm/(m$^2$/g), and a value O/S obtained by dividing the oxygen content O of samarium-iron-nitrogen alloy powder by the BET specific surface area S of the samarium-iron-nitrogen alloy powder is less than or equal to 11000 ppm/(m$^2$/g). When the value H/S exceeds 400 ppm/(m$^2$/g) or the value O/S exceeds 11000 ppm/(m$^2$/g), the coercivity of the samarium-iron-nitrogen alloy powder decreases.

Further, a value c/a obtained by dividing the lattice constant c along the c-axis direction of the samarium-iron-nitrogen alloy powder by the lattice constant a along the a-axis direction of the samarium-iron-nitrogen alloy powder is preferably 1.447~1.450, and more preferably 1.448~1.449. In this way, the coercivity of the samarium-iron-nitrogen alloy powder can be improved.

The samarium-iron-nitrogen alloy powder preferably has an average particle diameter less than or equal to 3 μm and a coercivity greater than or equal to 17 kOe. The coercivity of the samarium-iron-nitrogen alloy powder is more preferably greater than or equal to 20 kOe.

The maximum energy product of the samarium-iron-nitrogen alloy powder is preferably greater than or equal to 35 MGOe, and more preferably greater than or equal to 40 MGOe.

In the present specification and claims, samarium-iron-nitrogen alloy powder refers to an alloy powder containing samarium, iron, and nitrogen.

The samarium-iron-nitrogen alloy powder according to the present embodiment may further contain a rare earth element, such as neodymium or praseodymium, for example, and/or an iron group element other than iron.

[Method for Producing Samarium-Iron-Nitrogen Alloy Powder]

A method for producing a samarium-iron-nitrogen alloy powder according to an embodiment of the present invention includes steps of performing a reduction-diffusion process on a samarium-iron alloy precursor powder to produce a samarium-iron alloy powder, nitriding the samarium-iron alloy powder, washing the nitrided samarium-iron alloy powder with a solvent capable of dissolving calcium, and dehydrogenating the washed powder. Note that the above process steps are carried out in a non-oxidizing atmosphere. In this way, a samarium-iron-nitrogen alloy powder having high coercivity can be produced.

In the present specification and claims, non-oxidizing atmosphere refers to a gas atmosphere not containing an oxidizing gas such as oxygen, ozone, nitrogen dioxide, and the like.

[Producing Samarium-Iron Alloy Precursor Powder]

The samarium-iron alloy precursor powder is not particularly limited as long as a samarium-iron alloy powder can be produced therefrom by a reduction-diffusion process. However, a samarium-iron (hydro) oxide powder is preferably used.

In the present specification and claims, samarium-iron alloy powder refers to an alloy powder containing samarium and iron.

The samarium-iron alloy powder according to the present embodiment may further contain a rare earth element, such as neodymium or praseodymium, for example, and/or an iron group element other than iron.

The samarium-iron (hydro) oxide powder may be produced by a coprecipitation method. Specifically, first, a precipitating agent such as alkali is added to an acidic solution containing samarium salt and iron salt to cause precipitation of a precipitate composed of compounds of samarium and iron (mainly hydroxides), and the precipitate is collected by filtration, centrifugation, or the like. Then, the precipitate is washed and then dried in a hot air oven to obtain a samarium-iron (hydro) oxide. Further, the samarium-iron (hydro) oxide is coarsely pulverized with a blade mill or the like, and finely pulverized with a bead mill or the like to produce a samarium-iron (hydro) oxide powder.

Note that counter ions in the samarium salt and the iron salt are not limited to inorganic ions such as chloride ion, sulfate ion, nitrate ion and the like, and may be organic ions such as alkoxide.

The solvent contained in the acidic solution may be water or an organic solvent such as ethanol, for example.

The alkali used as the precipitating agent may be a hydroxide, ammonia, or some other substance, such as urea, that decomposes under an external action such as heat to act as a precipitating agent.

Note that instead of drying the precipitate in a hot air oven, vacuum drying may be carried out. In this case, a samarium-iron hydroxide is primarily obtained.

Note also, that instead of using a samarium-iron (hydro) oxide powder as the samarium-iron alloy precursor powder, an iron (hydro) oxide-samarium compound composite produced by adding samarium salt to a suspension containing iron hydroxide particles or iron oxide particles having particle diameters that are controlled and evaporating the suspension or adding a precipitating agent to the suspension may be used as the samarium-iron alloy precursor.

Also, a composite of iron particles produced by atomization, for example, and a samarium compound, or a mixture of iron particles and samarium oxide particles that is mixed using a ball mill or the like and finely pulverized may be used as the samarium-iron alloy precursor powder.

Also, an iron (hydro) oxide-samarium compound composite produced by adding an iron salt to a suspension containing samarium compound particles having particle diameters that are controlled and evaporating the suspension or adding a precipitating agent to the suspension may be used as the samarium-iron alloy precursor powder.

[Reduction-Diffusion Process]

The method of performing a reduction-diffusion process on the samarium-iron alloy precursor powder is not particularly limited, but for example, calcium or calcium hydride may be used to heat up the samarium-iron alloy precursor powder to a temperature greater than or equal to the melting point of calcium (about 850° C.) in an inert gas atmosphere. In this case, samarium reduced by calcium diffuses in a calcium melt and reacts with iron to thereby result in the generation of a samarium-iron alloy powder.

The temperature of the reduction-diffusion process and the particle diameter of the samarium-iron alloy powder are correlated; namely, the higher the reduction-diffusion temperature, the greater the particle diameter of the samarium-iron alloy powder. For example, in order to obtain a $Sm_2Fe_{17}$ powder having an average particle diameter less than or equal to 1 μm and a small amount of impurity phase, the reduction-diffusion process is performed at 880° C. to 950° C. for about 30 minutes to 2 hours in an inert gas atmosphere.

[Pre-Reduction]

In the case where the samarium-iron alloy precursor powder contains iron oxide or an iron compound, a pre-reduction process is preferably performed before performing the reduction-diffusion process in order to reduce the iron oxide or iron compound into iron particles. In this way, the particle diameter of the samarium-iron alloy powder can be reduced.

The method of performing the pre-reduction process on the samarium-iron alloy precursor powder is not particularly limited, but for example, a heat treatment may be performed at a temperature greater than or equal to 400° C. in a reducing atmosphere such as a hydrogen atmosphere. For example, in order to obtain a composite powder including iron particles, samarium-iron oxide particles, and samarium oxide particles having an average particle diameter less than or equal to 1 μm using a fixed bed heat treatment furnace, the pre-reduction process is performed at 500° C. to 800° C. in a hydrogen atmosphere.

[Nitriding]

The method of nitriding the samarium-iron alloy powder is not particularly limited, but for example, a heat treatment may be performed at 300° C. to 500° C. in an atmosphere of ammonia, a mixed gas of ammonia and hydrogen, nitrogen, a mixed gas of nitrogen and hydrogen, or the like.

The composition $Sm_2Fe_{17}N_3$ is known to be the optimum composition for the samarium-iron-nitrogen alloy powder to exhibit high coercivity, and as such, it is important to control the nitrogen content in the samarium-iron-nitrogen alloy powder. In the case of nitriding the samarium-iron alloy powder with ammonia, nitriding can be performed in a short period of time, but the nitrogen content in the samarium-iron-nitrogen alloy powder may become higher than the optimum value. In this case, after nitriding the samarium-iron alloy powder, excess nitrogen may be discharged from the $Sm_2Fe_{17}N_3$ lattice by annealing the samarium-iron-nitrogen alloy powder in hydrogen. Thus, a method using ammonia for nitriding the samarium-iron alloy powder is suitable for obtaining single-phase $Sm_2Fe_{17}N_3$ particles in a short period of time.

For example, the following nitriding process may be suitable. First, nitriding is carried out at 350° C. to 450° C. for 10 minutes to 2 hours in an ammonia-hydrogen mixture flowing atmosphere after which the atmosphere is switched to a hydrogen flowing atmosphere to perform heat treatment at the same temperature for 30 minutes to 2 hours to optimize the nitrogen content in the samarium-iron-nitrogen alloy powder. Then, the atmosphere is switched to an argon flowing atmosphere, and a heat treatment is performed at the same temperature for 0 to 1 hour to remove hydrogen.

[Washing]

The nitrided samarium-iron alloy powder contains impurities such as calcium oxide, unreacted metallic calcium, calcium nitride produced by nitridation of metallic calcium, calcium hydride, and the like. Thus, the nitrided samarium-iron alloy powder has to be washed with a solvent capable of dissolving calcium to remove impurities in order to use it as a magnet raw material powder; namely, a samarium-iron-nitrogen alloy powder.

The solvent capable of dissolving calcium is not particularly limited, but for example, water, alcohol and the like may be used. Generally, from the viewpoint of cost and safety, water is suitably used.

For example, most impurities can be removed by adding water to the nitrided samarium-iron alloy powder and repeating stirring and decantation. Further, by washing the samarium-iron alloy nitrided with a weakly acidic aqueous solution such as acetic acid having a pH of 4 to 6, residual calcium compounds and samarium-rich phases having low magnetic properties can be removed.

[Vacuum Drying]

The washed powder is preferably vacuum-dried in order to remove the solvent capable of dissolving calcium.

The temperature at which the washed powder is vacuum-dried is preferably in a range from room temperature to 100° C. In this way, oxidation of the washed powder can be prevented.

Note that the vacuum drying process may be performed after replacing the solvent in the washed powder with an organic solvent such as alcohol that is highly volatile and is miscible with water.

[Dehydrogenation]

The method of dehydrogenating the washed powder is not particularly limited, but for example, a heat treatment may be performed in vacuum or in an inert gas atmosphere. In this way, hydrogen that has entered in between the crystal lattices of the nitrided samarium-iron alloy powder upon washing the nitrided samarium-iron alloy powder can be removed, and as a result, the dehydrogenated powder can exhibit high coercivity.

The heat treatment conditions are preferably from 150° C. to 250° C. for 0.5 to 5 hours, and more preferably, from 170° C. to 230° C. for 2 to 4 hours.

[Pulverization]

By pulverizing the dehydrogenated powder, the remanent magnetization and the maximum energy product of the samarium-iron-nitrogen alloy powder can be improved.

The method for pulverizing the dehydrogenated powder is not particularly limited, but for example, various disintegration/pulverization methods using a jet mill, a dry ball mill, a wet ball mill, a vibration mill, a medium stirring mill, and the like under an inert gas atmosphere may be used.

EXAMPLES

In the following, embodiments of the present invention will be described with reference to examples. However, the present invention is not limited to the examples described below.

[Production of Samarium-Iron (Hydro) Oxide Powder]

65 g of iron nitrate nonahydrate and 13 g of samarium nitrate were dissolved in 800 mL of water after which 120 mL of a 2 mol/L potassium hydroxide aqueous solution was added dropwise while stirring, and the mixture was stirred overnight at room temperature to obtain a suspension. The suspension was filtered to collect suspended components, which were washed and then dried in a hot air drying oven at 120° C. overnight to obtain a sample. The obtained sample was coarsely pulverized with a blade mill and finely pulverized in ethanol with a rotary mill using a stainless steel ball. Then, after centrifugation, vacuum drying was performed to produce a samarium-iron (hydro) oxide powder.

Example 1

The following process steps were carried out in a glove box without exposure to the atmosphere.

The samarium-iron (hydro) oxide powder was subjected to a pre-reduction process in a hydrogen flowing atmosphere at 700° C. for 4 hours to obtain a powder. Then, 5 g of the obtained powder and 2.5 g of metallic calcium were placed in an iron crucible and subjected to a reduction-diffusion process at 900° C. for 1 hour in an argon atmosphere to obtain a samarium-iron alloy powder.

After cooling the obtained samarium-iron alloy powder to ambient temperature, the atmosphere was replaced with a hydrogen atmosphere and the temperature was raised to 380° C. Then, the samarium-iron alloy powder was nitrided by switching the atmosphere to an ammonia-hydrogen mixture flowing atmosphere with the ammonia-hydrogen mixture having a volume ratio of 1:2, raising the temperature to 420° C., and maintaining the above conditions for 1 hour to obtain a samarium-iron-nitrogen alloy powder. Further, the nitrogen content in the samarium-iron-nitrogen alloy powder was optimized by annealing the samarium-iron-nitrogen alloy powder in hydrogen at 420° C. for 1 hour, and then annealing the samarium-iron-nitrogen alloy powder in argon at 420° C. for 0.5 hours.

The obtained samarium-iron-nitrogen alloy powder was washed with pure water and then washed with a dilute aqueous acetic acid solution having a pH of 5 to remove calcium oxide generated in the reduction-diffusion process, unreacted metallic calcium, and samarium-rich phases. Then, after washing the samarium-iron-nitrogen alloy powder with pure water, water was replaced with isopropanol, and the samarium-iron-nitrogen alloy powder was vacuum dried at room temperature.

Lastly, the samarium-iron-nitrogen alloy powder was dehydrogenated in vacuum at 180° C. for 3 hours.

Example 2

A samarium-iron-nitrogen alloy powder was produced under the same conditions as in Example 1, except that the temperature at which the samarium-iron-nitrogen alloy powder was dehydrogenated was changed to 200° C.

Example 3

A samarium-iron-nitrogen alloy powder was produced under the same conditions as in Example 1, except that the temperature at which the samarium-iron-nitrogen alloy powder was dehydrogenated was changed to 220° C.

Example 4

A samarium-iron-nitrogen alloy powder was produced under the same conditions as in Example 2, except that the atmosphere for dehydrogenating the samarium-iron-nitrogen alloy powder was changed to argon gas.

Example 5

A samarium-iron-nitrogen alloy powder was produced under the same conditions as in Example 2, except that the temperature at which the reduction-diffusion process was performed on the samarium-iron (hydro) oxide powder subjected to the pre-reduction process was changed to 950° C., and the time period for dehydrogenating the samarium-iron-nitrogen alloy powder was changed to 1 hour.

Example 6

A samarium-iron-nitrogen alloy powder was produced under the same conditions as in Example 2, except that the temperature at which the reduction-diffusion process was performed on the samarium-iron (hydro) oxide powder subjected to the pre-reduction process was changed to 950° C.

Example 7

A samarium-iron-nitrogen alloy powder was produced under the same conditions as in Example 2, except that the temperature at which the reduction-diffusion process was performed on the samarium-iron (hydro) oxide powder subjected to the pre-reduction process was changed to 980° C.

Comparative Example 1

A samarium-iron-nitrogen alloy powder was produced under the same conditions as in Example 1, except that the samarium-iron-nitrogen alloy powder was not dehydrogenated.

Comparative Example 2

A samarium-iron-nitrogen alloy powder was produced under the same conditions as in Example 5, except that the samarium-iron-nitrogen alloy powder was not dehydrogenated.

Comparative Example 3

A samarium-iron-nitrogen alloy powder was produced under the same conditions as in Example 5, except that the time period for dehydrogenating the samarium-iron-nitrogen alloy powder was changed to 5 hours.

Comparative Example 4

A samarium-iron-nitrogen alloy powder was produced under the same conditions as in Example 6, except that the samarium-iron-nitrogen alloy powder was exposed to the atmosphere before being dehydrogenated.

Comparative Example 5

A samarium-iron-nitrogen alloy powder was produced under the same conditions as in Example 7, except that the samarium-iron-nitrogen alloy powder was not dehydrogenated.

Table 1 below indicates the production conditions of the above samarium-iron-nitrogen alloy powders.

TABLE 1

| | REDUCTION-DIFFUSION | | | DEHYDROGENATION | | |
|---|---|---|---|---|---|---|
| | ATMOSPHERE | TEMPERATURE [° C.] | TIME [h] | ATMOSPHERE | TEMPERATURE [° C.] | TIME [h] |
| EXAMPLE 1 | Ar | 900 | 1 | VACUUM | 180 | 3 |
| EXAMPLE 2 | Ar | 900 | 1 | VACUUM | 200 | 3 |
| EXAMPLE 3 | Ar | 900 | 1 | VACUUM | 220 | 3 |
| EXAMPLE 4 | Ar | 900 | 1 | Ar | 200 | 3 |
| EXAMPLE 5 | Ar | 950 | 1 | VACUUM | 200 | 1 |
| EXAMPLE 6 | Ar | 950 | 1 | VACUUM | 200 | 3 |
| EXAMPLE 7 | Ar | 980 | 1 | VACUUM | 200 | 3 |
| COMPARATIVE EXAMPLE 1 | Ar | 900 | 1 | — | — | — |
| COMPARATIVE EXAMPLE 2 | Ar | 950 | 1 | — | — | — |
| COMPARATIVE EXAMPLE 3 | Ar | 950 | 1 | VACUUM | 200 | 5 |
| COMPARATIVE EXAMPLE 4 | Ar | 950 | 1 | VACUUM | 200 | 3 |
| COMPARATIVE EXAMPLE 5 | Ar | 980 | 1 | — | — | — |

Next, the average particle diameter, the BET specific surface area, the composition, the lattice constant, and the magnetic properties of the samarium-iron-nitrogen alloy powders were measured.

[Average Particle Diameter]

The average particle diameter of each of the samarium-iron-nitrogen alloy powders was obtained by measuring the particle diameters of at least 200 particles randomly selected from an SEM image of each of the samarium-iron-nitrogen alloy powders (see, e.g., FIGS. 1 to 3) and calculating the arithmetic mean of the measured particle diameters.

[BET Specific Surface Area]

The BET specific surface areas of the samarium-iron-nitrogen alloy powders were measured using the nitrogen gas adsorption method.

[Composition]

The nitrogen content of the samarium-iron-nitrogen alloy powders was measured using the inert gas fusion-thermal conductivity method.

Note that the nitrogen content of all of the above samarium-iron-nitrogen alloy powders, irrespective of their BET specific surface areas or whether they underwent dehydrogenation, was about 3.3% by mass, indicating that the samarium-iron-nitrogen alloy powders had suitable nitrogen content for exhibiting high magnetic properties.

The oxygen content and the hydrogen content of the samarium-iron-nitrogen alloy powders were measured by the inert gas fusion-non-dispersive infrared absorption method.

[Lattice Constant]

X-ray diffraction (XRD) of the samarium-iron-nitrogen alloy powder was measured using a cobalt (Co) tube at a tube voltage of 45 kV and a tube current of 40 A. At this time, lattice constant a and lattice constant c were calculated after correcting measurement errors by using silicon powder as a reference substance.

Note that a peak derived from an impurity phase other than a peak of a $Sm_2Fe_{17}N_3$ phase was not observed in any of the samarium-iron-nitrogen alloy powder samples, thereby indicating that $Sm_2Fe_{17}N_3$ powders with high purity were obtained.

[Magnetic Properties]

Samples were produced by mixing the samarium-iron-nitrogen alloy powders with resin and orienting the samples in a magnetic field of 2 T. Then, the samples were set in an easy direction of magnetization, and the magnetic properties of the samarium-iron-nitrogen alloy powder were measured using a vibrating sample magnetometer (VSM) at a temperature of 27° C. and a maximum applied magnetic field of 9 T.

Tables 2 and 3 below indicate the average particle diameter, the BET specific surface area, the composition, the lattice constant, and the magnetic properties of the samarium-iron-nitrogen alloy powders. Note that $M_r$, $M_s$, $H_{cj}$, and $BH_{max}$ in Table 3 respectively denote the remanent magnetization, the saturation magnetization, the coercivity, and the maximum energy product.

TABLE 2

| | AVERAGE PARTICLE DIAMETER [nm] | BET SPECIFIC SURFACE AREA S [m²/g] | COMPOSITION | | | O/S [ppm/(m²/g)] | H/S [ppm/(m²/g)] |
|---|---|---|---|---|---|---|---|
| | | | NITROGEN CONTENT [MASS %] | OXYGEN CONTENT (O) [ppm] | HYDROGEN CONTENT (H) [ppm] | | |
| EXAMPLE 1 | 630 | 1.4 | 3.38 | 12533 | 308 | 8952 | 220 |
| EXAMPLE 2 | 630 | 1.4 | 3.40 | 13191 | 294 | 9422 | 210 |
| EXAMPLE 3 | 630 | 1.4 | 3.36 | 13780 | 280 | 9843 | 200 |
| EXAMPLE 4 | 630 | 1.4 | 3.35 | 12651 | 301 | 9036 | 215 |
| EXAMPLE 5 | 930 | 0.9 | 3.40 | 7820 | 191 | 8689 | 212 |
| EXAMPLE 6 | 930 | 0.9 | 3.37 | 8110 | 197 | 9011 | 219 |
| EXAMPLE 7 | 1220 | 0.6 | 3.39 | 4478 | 120 | 7463 | 200 |
| COMPARATIVE EXAMPLE 1 | 630 | 1.4 | 3.31 | 11830 | 1266 | 8450 | 904 |
| COMPARATIVE EXAMPLE 2 | 930 | 0.9 | 3.39 | 7940 | 763 | 8822 | 848 |
| COMPARATIVE EXAMPLE 3 | 930 | 0.9 | 3.41 | 12200 | 189 | 13500 | 210 |
| COMPARATIVE EXAMPLE 4 | 930 | 0.9 | 3.34 | 11670 | 201 | 12967 | 223 |
| COMPARATIVE EXAMPLE 5 | 1220 | 0.6 | 3.41 | 6376 | 492 | 10627 | 820 |

TABLE 3

| | LATTICE CONSTANT | | | MAGNETIC PROPERTY | | | |
|---|---|---|---|---|---|---|---|
| | a [Å] | c [Å] | c/a | $M_r$ [emu/g] | $M_s$ [emu/g] | $H_{cj}$ [kOe] | $BH_{max}$ MGOe |
| EXAMPLE 1 | 8.747 | 12.673 | 1.4488 | 102 | 133 | 22.2 | 19.2 |
| EXAMPLE 2 | 8.742 | 12.661 | 1.4483 | 100 | 134 | 22.8 | 19.9 |
| EXAMPLE 3 | 8.743 | 12.663 | 1.4483 | 101 | 134 | 22.7 | 18.7 |
| EXAMPLE 4 | 8.745 | 12.666 | 1.4484 | 101 | 133 | 22.4 | 18.1 |
| EXAMPLE 5 | 8.743 | 12.665 | 1.4486 | 111 | 143 | 17.0 | 21.9 |
| EXAMPLE 6 | 8.743 | 12.665 | 1.4487 | 110 | 142 | 18.1 | 22.2 |
| EXAMPLE 7 | 8.736 | 12.655 | 1.4488 | 120 | 145 | 18.0 | 28.5 |
| COMPARATIVE EXAMPLE 1 | 8.725 | 12.696 | 1.4552 | 105 | 146 | 15.6 | 20.5 |
| COMPARATIVE EXAMPLE 2 | 8.747 | 12.709 | 1.4530 | 113 | 149 | 13.5 | 21.7 |
| COMPARATIVE EXAMPLE 3 | 8.742 | 12.666 | 1.4488 | 109 | 143 | 15.6 | 21.5 |

TABLE 3-continued

| | LATTICE CONSTANT | | | MAGNETIC PROPERTY | | | |
|---|---|---|---|---|---|---|---|
| | a [Å] | c [Å] | c/a | $M_r$ [emu/g] | $M_s$ [emu/g] | $H_{cj}$ [kOe] | $BH_{max}$ MGOe] |
| COMPARATIVE EXAMPLE 4 | 8.744 | 12.674 | 1.4495 | 107 | 140 | 16.2 | 20.7 |
| COMPARATIVE EXAMPLE 5 | 8.743 | 12.690 | 1.4514 | 125 | 152 | 13.2 | 22.7 |

It can be appreciated from Tables 2 and 3 that the samarium-iron-nitrogen alloy powders of Examples 1 to 7 have high coercivity.

On the other hand, the coercivity of the samarium-iron-nitrogen alloy powder of Comparative Example 1 is lower as compared with those of the samarium-iron-nitrogen alloy powders of Examples 1 to 4 having the same average particle diameter because the samarium-iron-nitrogen alloy powder of Comparative Example 1 was not dehydrogenated and has a value H/S equal to 904 ppm/(m²/g).

The coercivity of the samarium-iron-nitrogen alloy powder of Comparative Example 2 is lower as compared with those of the samarium-iron-nitrogen alloy powders of Example 5 and Example 6 having the same average particle diameter because the samarium-iron-nitrogen alloy powder of Comparative Example 2 was not dehydrogenated and has a value H/S equal to 848 ppm/(m²/g).

The coercivity of the samarium-iron-nitrogen alloy powder of Comparative Example 3 is lower as compared with those of the samarium-iron-nitrogen alloy powders of Examples 5 and 6 having the same average particle diameter because the samarium-iron-nitrogen alloy powder of Comparative Example 3 was dehydrogenated for 5 hours such that its oxygen content was increased to have a value O/S equal to 13500 ppm/(m²/g).

The coercivity of the samarium-iron-nitrogen alloy powder of Comparative Example 4 is lower as compared with those of the samarium-iron-nitrogen alloy powder of Examples 5 and 6 having the same average particle diameter because the samarium-iron-nitrogen alloy powder of Comparative Example 4 was once exposed to the atmosphere before being dehydrogenated and has a value O/S equal to 12967 ppm/(m²/g).

The coercivity of the samarium-iron-nitrogen alloy powder of Comparative Example 5 is lower as compared with those of the samarium-iron-nitrogen alloy powder of Example 7 having the same average particle diameter because the samarium-iron-nitrogen alloy powder of Comparative Example 5 was not dehydrogenated and has a value H/S equal to 820 ppm/(m²/g).

Also, it can be appreciated that the samarium-iron-nitrogen alloy powders of Examples 1 to 7 have values c/a that are closer to the theoretical value (1.4485) as compared with the samarium-iron-nitrogen alloy powders of Comparative Examples 1, 2 and 5. Such difference may be attributed to expansion of the crystal lattices along the c-axis direction occurring in the samarium-iron-nitrogen alloy powders of Comparative Examples 1, 2 and 5 as a result of hydrogen entering in between the $Sm_2Fe_{17}N_3$ crystal lattices of the samarium-iron-nitrogen alloy powders of Comparative Examples 1, 2 and 5. On the other hand, because the samarium-iron-nitrogen alloy powders of Examples 1 to 7 are dehydrogenated, expansion of the crystal lattices along the c-axis direction may be controlled, and such an effect may presumably be the reason the samarium-iron-nitrogen alloy powders of Examples 1 to 7 are able to exhibit high coercivity.

Note that the existence of a samarium-iron-nitrogen alloy powder not containing a nonmagnetic element and having a coercivity exceeding 20 kOe has been unprecedented.

The coercivity of a magnetic powder is maximized when the particles are in the vicinity of the single magnetic domain critical diameter, and the samarium-iron-nitrogen alloy has a single domain critical diameter of 0.3 µm. As such, by further micronizing the particles of the samarium-iron-nitrogen alloy powder, a samarium-iron-nitrogen alloy powder having an even higher coercivity may be produced.

Also, it can be appreciated from Example 7 that the effect of improving coercivity by dehydrogenation is not limited to the case where the average particle diameter of the samarium-iron-nitrogen alloy powder is less than or equal to 1 µm. Note that samarium-iron-nitrogen alloy powders are known to exhibit particularly high coercivity when the average particle diameter (Da) is less than or equal to 3 µm (see, e.g., FIG. 3 of Patent Document 2). Thus, the effect of improving coercivity by dehydrogenation may be particularly effective when the average particle diameter of the samarium-iron-nitrogen alloy powder is less than or equal to 3 µm.

Further, in Examples 1 to 3, the reduction-diffusion process was performed at 900° C., and dehydrogenation temperatures in the range from 180° C. to 220° C. were examined. As a result, it was confirmed that all the samarium-iron-nitrogen alloy powders had about the same coercivity. Also, it was confirmed that the oxygen content of the samarium-iron-nitrogen alloy powder increased and the hydrogen content decreased as the dehydrogenation temperature increased.

In general, the coercivity of a rare earth magnet powder decreases as the oxygen content increases. It can be presumed from the above that the samarium-iron-nitrogen alloy powders of the above examples exhibited about the same coercivity because an increase in coercivity due to a decrease in hydrogen content has been offset by a decrease in coercivity due to an increase in oxygen content.

Thus, the coercivity of a samarium-iron-nitrogen alloy powder may presumably be further improved by implementing dehydrogenation while preventing an increase in oxygen content.

Also, it can be appreciated from Examples 2 and 4 that the atmosphere for dehydrogenation is not limited to vacuum, and substantially similar effects can be obtained by using an inert gas such as argon gas.

Further, in Examples 5 and 6, the influence of the dehydrogenation time was examined. The results indicate improvement in coercivity by dehydrogenation in both Examples 5 and 6. Although there were no substantial differences in oxygen content and hydrogen content, a slight difference in coercivity was observed. This may be attributed to a slight difference in crystal structure due to a change in the position of hydrogen remaining in the lattice.

Note, however, that when the dehydrogenation time was too long as in Comparative Example 3, the oxygen content of the samarium-iron-nitrogen alloy powder increased and the effect of improving coercivity by dehydrogenation decreased.

Also, as in Comparative Example 4, once exposed to the atmosphere before dehydrogenation, the oxygen content increased and coercivity of the samarium-iron-nitrogen alloy powder did not substantially increase. Based on the above, it was confirmed that by carrying out the series of production process steps without exposure to the atmosphere, a samarium-iron-nitrogen alloy powder having high coercivity that is protected from the influences of oxidation can be produced.

The above examples suggest that by further reducing the oxygen content, the coercivity of a samarium-iron-nitrogen alloy powder may be further increased.

Figure 1:
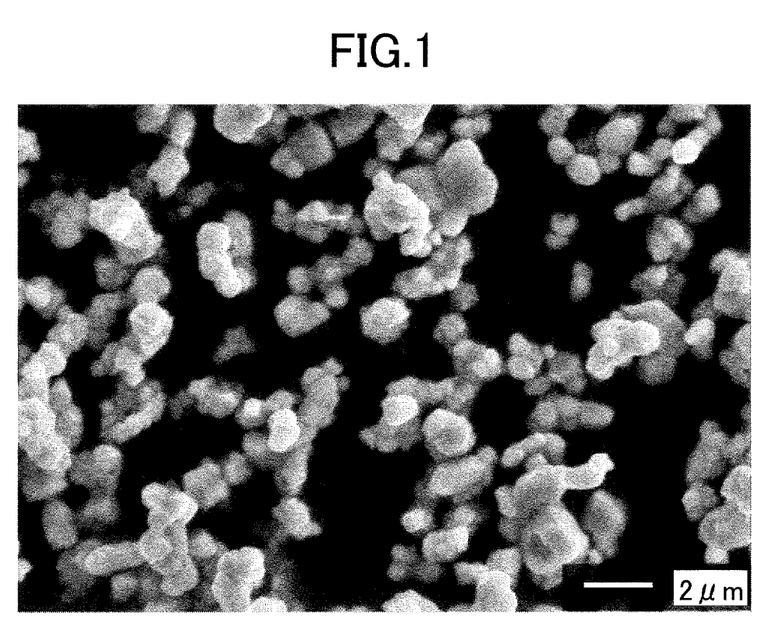
FIG. 1 is an SEM image of a samarium-iron-nitrogen alloy powder of Example 1.
Figure 2:
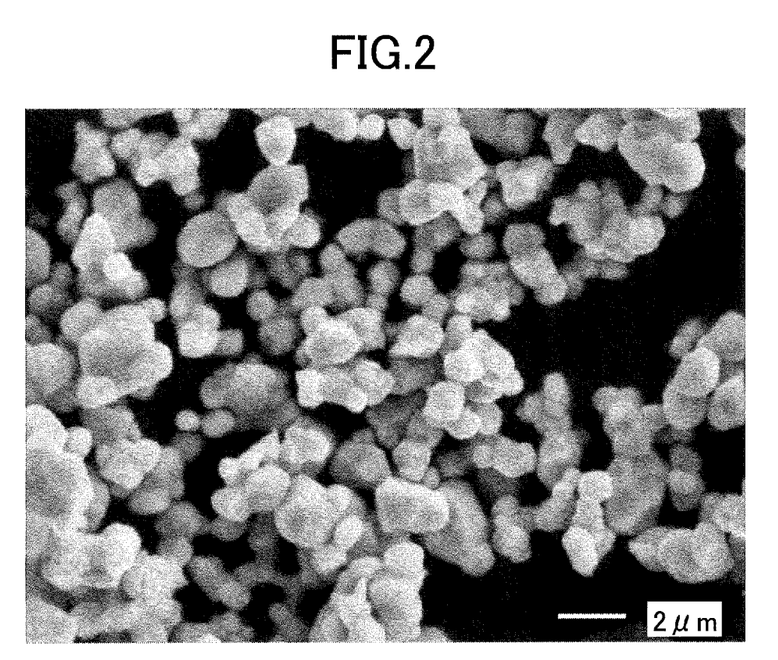
FIG. 2 is an SEM image of a samarium-iron-nitrogen alloy powder of Example 5.
Figure 3:
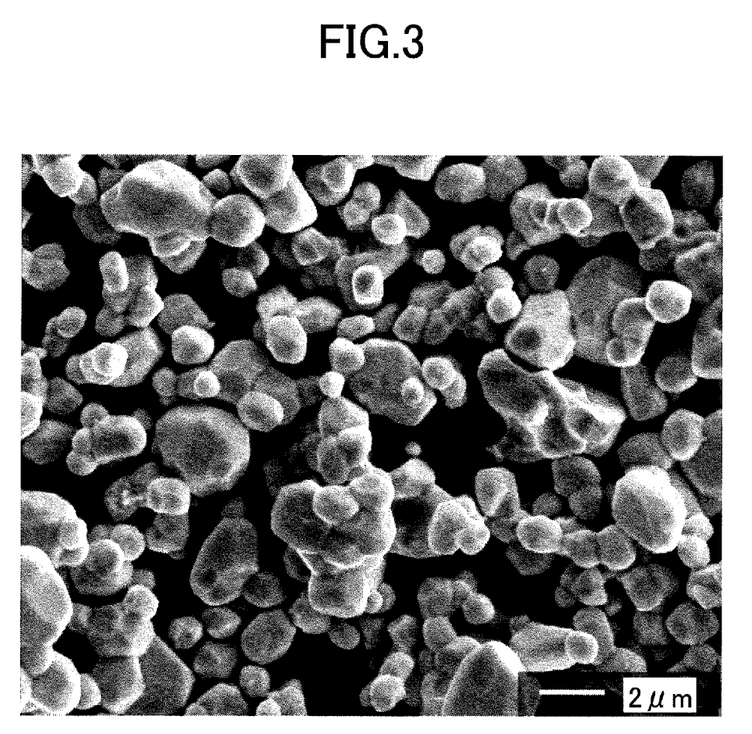
FIG. 3 is an SEM image of a samarium-iron-nitrogen alloy powder of Example 7.

FIGS. 1 to 3 show extensive necking occurring in the samarium-iron-nitrogen alloy powders that are reflected in the slightly low values of remanent magnetization as indicated in Table 1. Such necking may be solved by pulverization.

Examples 8 and 9

The samarium-iron-nitrogen alloy powders produced in Examples 6 and 7 were shaken in hexane at room temperature for 2 hours in a nitrogen gas atmosphere using a vortex mixer and a stainless steel ball having an outer diameter of 1 mm to pulverize the samarium-iron-nitrogen alloy powders.

Table 4 below indicates the magnetic properties of the resulting samarium-iron-nitrogen alloy powders. Note that $M_r$, $M_s$, $H_{cj}$, and $BH_{max}$ in Table 4 respectively denote the remanent magnetization, the saturation magnetization, the coercivity, and the maximum energy product.

TABLE 4

| | MAGNETIC PROPERTY | | | |
|---|---|---|---|---|
| | $M_r$ [emu/g] | $M_s$ [emu/g] | $H_{cj}$ [kOe] | $BH_{max}$ [MGOe] |
| EXAMPLE 8 | 141 | 156 | 14.3 | 42.8 |
| EXAMPLE 9 | 137 | 152 | 14.7 | 38.2 |

It can be appreciated from Table 4 that by pulverizing a samarium-iron-nitrogen alloy powder, its inherently high remanent magnetization can be exhibited and a samarium-iron-nitrogen alloy powder having a maximum energy product exceeding 35 MGOe can be obtained.

As described above, by performing a reduction-diffusion process on a samarium-iron (hydro) oxide powder produced by a coprecipitation method to obtain a samarium-iron alloy powder, nitriding the obtained samarium-iron alloy powder, washing the nitrided samarium-iron alloy powder with water and a weakly acidic aqueous solution, and dehydrogenating the washed powder, a samarium-iron-nitrogen alloy powder having an unprecedented high coercivity can be produced. Further, by pulverizing the samarium-iron-nitrogen alloy powder, a samarium-iron-nitrogen alloy powder having a high energy product can be produced. By reducing the oxygen content and the hydrogen content of a samarium-iron-nitrogen alloy powder, a samarium-iron-nitrogen alloy powder with even higher coercivity and energy product can presumably be produced.

INDUSTRIAL APPLICABILITY

Because a samarium-iron-nitrogen alloy powder has excellent heat resistance, a magnet having both high magnetic properties and heat resistance may be manufactured therefrom and applied in home appliances such as air conditioners, manufacturing robots, automobiles, and the like, and used as raw material of sintered magnets or bonded magnets used in motors, sensors, and the like that require high magnetic properties and heat resistance, for example.

The present application is based on and claims the benefit of priority of Japanese Patent Application No. 2016-041692 filed on Mar. 4, 2016, the entire contents of which are herein incorporated by reference.

The invention claimed is:

1. A samarium-iron-nitrogen alloy powder characterized in that:
   a value obtained by dividing a hydrogen content of the samarium-iron-nitrogen alloy powder by a BET specific surface area of the samarium-iron-nitrogen alloy powder is in a range of from 200 ppm/m$^2$/g) to 400 ppm/(m$^2$/g);
   a value obtained by dividing an oxygen content of the samarium-iron-nitrogen alloy powder by the BET specific surface area of the samarium-iron-nitrogen alloy powder is less than or equal to 11,000 ppm/(m$^2$/g);
   an average particle diameter of the samarium-iron-nitrogen alloy powder is less than or equal to 1 μm; and
   a coercivity of the samarium-iron-nitrogen alloy powder is at least 18 kOe when the average particle diameter is 1 μm and the coercivity increases as the average particle diameter decreases from 1 μm, to 0.63 μm.

2. The samarium-iron-nitrogen alloy powder according to claim 1, wherein
   a value c/a obtained by dividing a lattice constant c along the c-axis direction of the samarium-iron-nitrogen alloy powder by a lattice constant a along the a-axis direction of the samarium-iron-nitrogen alloy powder is greater than or equal to 1.447 and less than or equal to 1.450.

3. The samarium-iron-nitrogen alloy powder according to claim 1, wherein a maximum energy product of the samarium-iron-nitrogen alloy powder is greater than or equal to 35 MGOe.

4. The samarium-iron-nitrogen alloy powder according to claim 1, wherein
   the average particle diameter of the samarium-iron-nitrogen alloy powder is in a range of from 0.63 μm to 1 μm.

5. The samarium-iron-nitrogen alloy powder according to claim 1, wherein
   the average particle diameter of the samarium-iron-nitrogen alloy powder is in a range of from 0.63 μm to 0.93 μm.

6. A method for producing a samarium-iron-nitrogen alloy powder having an average particle diameter of less than or equal to 1 μm, the method comprising:
   performing a reduction-diffusion process on a samarium-iron alloy precursor powder to produce a samarium-iron alloy powder;
   nitriding the samarium-iron alloy powder;
   washing the nitrided samarium-iron alloy powder with a solvent capable of dissolving calcium; and
   dehydrogenating the washed powder to produce the samarium-iron-nitrogen alloy powder such that a value obtained by dividing a hydrogen content of the samarium-iron-nitrogen alloy powder by a BET specific surface area of the samarium-iron-nitrogen alloy powder is in a range of from 200 ppm/(m$^2$/g) to 400 ppm/(m$^2$/g), and a value obtained by dividing an oxygen content of the samarium-iron-nitrogen alloy powder by the BET specific surface area of the samarium-iron-nitrogen alloy powder is less than or equal to 11,000 ppm/(m$^2$/g);

wherein the reduction-diffusion process step, the nitriding step, the washing step, and the dehydrogenating step are carried out in a non-oxidizing atmosphere, and the samarium-iron-nitrogen alloy powder has a coercivity of at least 18 kOe when the average particle diameter is 1 μm and the coercivity increases as the average particle diameter decreases from 1 μm to 0.63 μm.

7. The method for producing a samarium-iron-nitrogen alloy powder according to claim 6, further comprising a step of:

pulverizing the dehydrogenated powder.

* * * * *